United States Patent
Li et al.

(10) Patent No.: US 11,443,523 B2
(45) Date of Patent: Sep. 13, 2022

(54) DYNAMIC OBSTACLE POINT CLOUD ANNOTATING METHOD AND APPARATUS, DEVICE AND READABLE MEDIUM

(71) Applicant: BAIDU ONLINE NETWORK TECHNOLOGY (BEIJING) CO., LTD., Haidian District Beijing (CN)

(72) Inventors: Xiaohui Li, Haidian District Beijing (CN); Jiang Guo, Haidian District Beijing (CN); Liang Wang, Haidian District Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 1050 days.

(21) Appl. No.: 16/118,171

(22) Filed: Aug. 30, 2018

(65) Prior Publication Data

US 2019/0080183 A1 Mar. 14, 2019

(30) Foreign Application Priority Data

Sep. 14, 2017 (CN) .......................... 201710828450.3

(51) Int. Cl.
| | | |
|---|---|---|
| *G06V 20/58* | (2022.01) | |
| *G06T 17/20* | (2006.01) | |
| *G06V 20/64* | (2022.01) | |
| *G05D 1/00* | (2006.01) | |
| *G05D 1/02* | (2020.01) | |
| *G06T 19/00* | (2011.01) | |

(52) U.S. Cl.
CPC .......... *G06V 20/58* (2022.01); *G05D 1/0088* (2013.01); *G05D 1/0246* (2013.01); *G06T 17/20* (2013.01); *G06T 19/00* (2013.01); *G06V 20/64* (2022.01); *G05D 2201/0213* (2013.01); *G06T 2207/10028* (2013.01); *G06T 2207/30261* (2013.01); *G06T 2210/56* (2013.01); *G06T 2219/004* (2013.01); *G06V 2201/12* (2022.01)

(58) Field of Classification Search
None
See application file for complete search history.

(56) References Cited

PUBLICATIONS

Sofer et al. (Interactive Learning for Point-Cloud Motion Segmentation, Pacific Graphics 2013) (Year: 2013).*
Hur et al. (Precise free space detection and its application to background extraction, IEEE, 2015) (Year: 2015).*

* cited by examiner

*Primary Examiner* — Kyle Zhai
(74) *Attorney, Agent, or Firm* — Brooks Kushman P.C.

(57) ABSTRACT

A method comprises: collecting first point cloud data under a static scenario around a target collecting point; building a static background mesh model under the static scenario around the target collecting point according to the first point cloud data; collecting a second point cloud data of a target frame under a dynamic scenario after a dynamic obstacle moves around the target collecting point; annotating the point cloud of dynamic obstacle in the second point cloud data corresponding to the target frame, according to the static background mesh model. Through the technical solution of the present disclosure, it is feasible to automatically annotate the point cloud of the dynamic obstacle, effectively save manpower and annotation time spent in annotating the dynamic obstacle point cloud, and thereby effectively improve the efficiency of annotating the dynamic obstacle.

6 Claims, 3 Drawing Sheets

DYNAMIC OBSTACLE POINT CLOUD ANNOTATING METHOD AND APPARATUS, DEVICE AND READABLE MEDIUM

The present application claims the priority of Chinese Patent Application No. 201710828450.3, filed on Sep. 14, 2017, with the title of "Dynamic obstacle point cloud annotating method and apparatus, device and readable medium". The disclosure of the above applications is incorporated herein by reference in its entirety.

FIELD OF THE DISCLOSURE

The present disclosure relates to the technical field of computer application, and particularly to a dynamic obstacle point cloud annotating method and apparatus, a device and a readable medium.

BACKGROUND OF THE DISCLOSURE

In autonomous driving, an autonomous vehicle needs to quickly perform environment perception, recognize surrounding obstacles, accurately perform decision-making control, and travel safely avoiding obstacles to ensure the autonomous vehicle's safe travel. Before performing environment perception and decision-making control, the autonomous vehicle needs to collect a lot of training data, and perform machine learning based on a lot of training data, obtain a trained environment perception and decision-making control module after deep learning, and thereby achieve environment perception and decision-making control based on the duly-trained module.

In the prior art, obstacles around the autonomous vehicle mainly include static obstacles and dynamic obstacles, wherein the static obstacles include obstacles fixed on sides of a road such as a median strip, traffic lights and guardrails. The dynamic obstacles include various vehicles travelling in the road and pedestrians walking in the road. The training data collected upon training the model need to identify a class of each type of obstacles around the autonomous vehicle and a corresponding point cloud, to train the autonomous vehicle's environment perception capability and decision-making control capability. Currently, annotation of dynamic obstacles from a laser radar point cloud data is generally implemented by designing a visualization interface of the point cloud data and developing software of a human-machine interaction window. An annotator visually observes each frame of point cloud with naked eyes through the software, and determines the location of the dynamic obstacle; then around the dynamic obstacle, uses a mouse to manually click and drag a bounding rectangular box and inputs other information such as an obstacle type; finally the software stores information such as location, size, direction and type of the dynamic obstacle included in the rectangular box as a file, and outputs it as an annotation result.

In the above prior art, when the dynamic obstacle point cloud is annotated manually, the annotation process not only needs to consume manpower and but also is time-consuming, for example, it takes 10-20 minutes to annotate the dynamic obstacle in each frame of point cloud data. Therefore, the current manner of annotating the dynamic obstacle point cloud shows a very low annotation efficiency.

SUMMARY OF THE DISCLOSURE

The present disclosure provides a dynamic obstacle point cloud annotating method and apparatus, a device and a readable medium, which are used to improve the efficiency of annotating the dynamic obstacle point cloud.

The present disclosure provides a dynamic obstacle point cloud annotating method, the method comprising:
  collecting first point cloud data under a static scenario around a target collecting point;
  building a static background mesh model under the static scenario around the target collecting point according to the first point cloud data;
  collecting a second point cloud data of a target frame under a dynamic scenario after a dynamic obstacle moves around the target collecting point;
  annotating the point cloud of dynamic obstacle in the second point cloud data corresponding to the target frame, according to the static background mesh model.

Further optionally, in the method, the building a static background mesh model under the static scenario around the target collecting point according to the first point cloud data specifically comprises:
  performing mesh processing for the first point cloud data in a 3-dimensional space to obtain a 3-dimensional mesh model;
  according to whether each mesh in the 3-dimensional mesh model includes valid points in the first point cloud data, setting a background attribute for the corresponding mesh to obtain the static background mesh model under the static scenario around the target collecting point.

Further optionally, in the method, the step of, according to whether each mesh in the 3-dimensional mesh model includes valid points in the first point cloud data, setting a background attribute for the corresponding mesh specifically comprises:
  judging whether meshes in the 3-dimensional mesh model include valid points in the first point cloud data, and if yes, setting the background attribute of the corresponding mesh as 1; otherwise, setting the background attribute of the corresponding mesh as 0.

Further optionally, in the method, the annotating the point cloud of dynamic obstacle in the second point cloud data corresponding to the target frame, according to the static background mesh model specifically comprises:
  projecting each target point of the second point cloud data into the static background mesh model;
  obtaining the background attribute of the mesh in the static background mesh model into which each target point is projected;
  according to the background attribute of the mesh in the static background mesh model into which each target point is projected, recognizing whether the corresponding target point belongs to a point of the dynamic obstacle; performing clustering processing for all points belonging to dynamic obstacles in the second point cloud data, to obtain the corresponding point cloud of dynamic obstacle.

Further optionally, in the method, the step of, according to the background attribute of the mesh in the static background mesh model into which each target point is projected, recognizing whether the corresponding target point belongs to a point of the dynamic obstacle specifically comprises:
  judging whether the background attribute of the mesh in the static background mesh model into which each target point is projected is 1 or 0;
  if the background attribute of the mesh in the static background mesh model into which the corresponding target point is projected is 1, determining the target point as the background point of the static attribute;

if the background attribute of the mesh in the static background mesh model into which the corresponding target point is projected is 0, determining the target point as the point of the dynamic obstacle.

The present disclosure provides a dynamic obstacle point cloud annotating apparatus, the apparatus comprising:

a collecting module configured to collect first point cloud data under a static scenario around a target collecting point;

a building module configured to build a static background mesh model under the static scenario around the target collecting point according to the first point cloud data;

the collecting module further configured to collect a second point cloud data of a target frame under a dynamic scenario after a dynamic obstacle moves around the target collecting point;

an annotating module configured to annotate the point cloud of dynamic obstacle in the second point cloud data corresponding to the target frame, according to the static background mesh model.

Further optionally, in the apparatus, the building module comprises:

a mesh processing unit configured to perform mesh processing for the first point cloud data in a 3-dimensional space to obtain a 3-dimensional mesh model;

a setting unit configured to, according to whether each mesh in the 3-dimensional mesh model includes valid points in the first point cloud data, set a background attribute for the corresponding mesh to obtain the static background mesh model under the static scenario around the target collecting point.

Further optionally, in the apparatus, the setting unit is specifically configured to judge whether meshes in the 3-dimensional mesh model include valid points in the first point cloud data, and if yes, set the background attribute of the corresponding mesh as 1; otherwise, set the background attribute of the corresponding mesh as 0.

Further optionally, in the apparatus, the annotating module comprises:

a projecting unit configured to project each target point of the second point cloud data into the static background mesh model;

an obtaining unit configured to obtain the background attribute of the mesh in the static background mesh model into which each target point is projected;

a recognizing unit configured to, according to the background attribute of the mesh in the static background mesh model into which each target point is projected, recognize whether the corresponding target point belongs to a point of the dynamic obstacle;

a clustering unit configured to perform clustering processing for all points belonging to dynamic obstacles in the second point cloud data, to obtain the corresponding point cloud of dynamic obstacle.

Further optionally, in the apparatus, the recognizing unit is specifically configured to:

judge whether the background attribute of the mesh in the static background mesh model into which each target point is projected is 1 or 0;

if the background attribute of the mesh in the static background mesh model into which the corresponding target point is projected is 1, determine the target point as the background point of the static attribute;

if the background attribute of the mesh in the static background mesh model into which the corresponding target point is projected is 0, determine the target point as the point of the dynamic obstacle.

The present disclosure further provides a computer device, the device comprising:

one or more processors;

a storage for storing one or more programs;

a laser radar used to scan point cloud data under a static scenario around a target collecting point or under a dynamic scenario after the dynamic obstacle moves;

the one or more programs, when executed by said one or more processors, enable said one or more processors to implement the above-mentioned dynamic obstacle point cloud annotating method.

The present disclosure further provides a computer readable medium on which a computer program is stored, the program, when executed by a processor, implementing the above-mentioned dynamic obstacle point cloud annotating method.

According to the dynamic obstacle point cloud annotating method and apparatus, the device and the readable medium of the present disclosure, it is feasible to collect first point cloud data under a static scenario around a target collecting point; build the static background mesh model under the static scenario around the target collecting point according to the first point cloud data; collect a second point cloud data of a target frame under the dynamic scenario after a dynamic obstacle moves around the target collecting point; annotate the point cloud of the dynamic obstacle in the second point cloud data corresponding to the target frame, according to the static background mesh model. Through the technical solution of the present disclosure, it is feasible to automatically annotate the point cloud of the dynamic obstacle, effectively save manpower and annotation time spent in annotating the dynamic obstacle point cloud, and therefore effectively improve the efficiency of annotating the dynamic obstacle.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
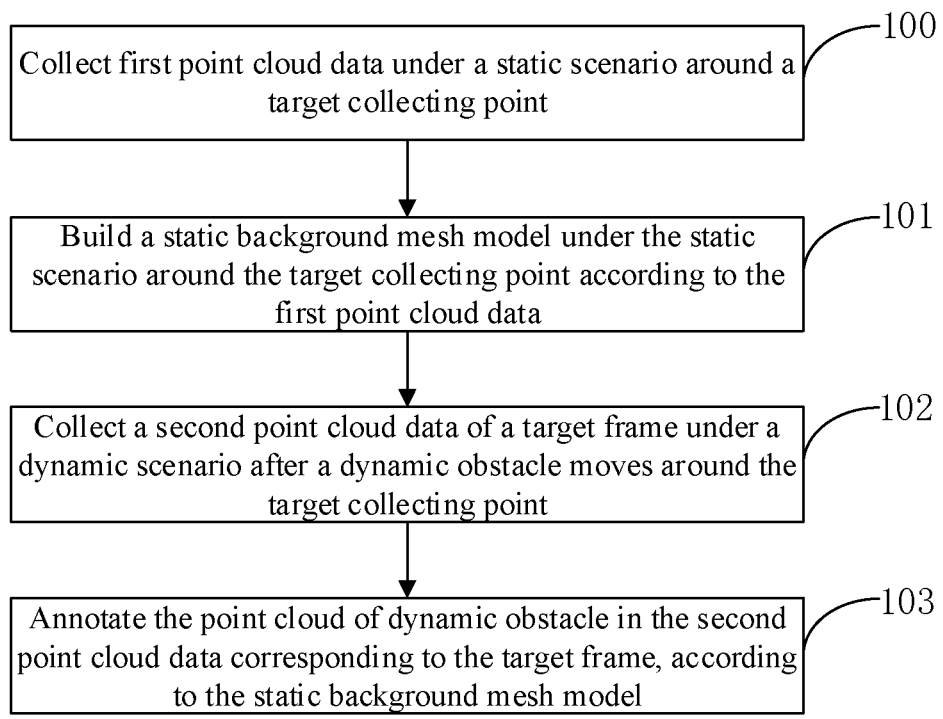
FIG. 1 is a flow chart of an embodiment of a dynamic obstacle point cloud annotating method according to the present disclosure.

FIG. 1 is a flow chart of an embodiment of a dynamic obstacle point cloud annotating method according to the present disclosure. As shown in FIG. 1, the dynamic obstacle point cloud annotating method according to the present embodiment may specifically include the following steps:

100: collecting first point cloud data under a static scenario around a target collecting point;

A subject for executing the dynamic obstacle point cloud annotating method according to the present embodiment is a dynamic obstacle point cloud annotating apparatus. The dynamic obstacle point cloud annotating apparatus may be an electronic entity.

Upon implementation of the dynamic obstacle point cloud annotating method according to the present embodiment, a laser radar mounted on a collecting vehicle located at a target collecting point collects the first point cloud data under a static scenario around the target collecting point. The first point cloud data of the present embodiment may be a frame of point cloud data around the target collecting point. However, since points in a 3D space included by a certain frame of point cloud data might not be thorough and rich enough, optionally in the present embodiment, it may be the laser radar that collects multiple frames of raw point cloud data under the static scenario around the target collecting point. Since there are some differences between the multiple frames of raw point cloud data, joining multiple frames of raw point cloud data to obtain the first point cloud data may remedy the problem that the point cloud is not thorough and rich enough because only a certain frame of raw point cloud data is selected as the first point cloud data. The multiple frames of raw point cloud data in the present embodiment may be obtained by drawing from originally-collected continuous multiple frames of point cloud data at a certain down-sampling frequency such as 5 hz, 10 hz or 20 hz. Use of the down-sampling drawing manner may avoid occupation of an excessive storage space caused by joining all raw point cloud data.

In the present embodiment, the dynamic obstacles in the road are annotated to facilitate obtainment of training data for training the environment perception and decision-making control module of the autonomous vehicle. Therefore, in the present embodiment, the first point cloud data of the static scenario is collected to assist in subsequently annotating the dynamic obstacle point cloud. Therefore, the target collecting point of the present embodiment may employ a certain point in the road or beside the road, or a point on the road with obvious features, e.g., a point cloud that is similar to a turning point in the road and capable of scanning the dynamic obstacle when the dynamic obstacle is present in the road. Upon use, the laser radar is positioned on the target collecting point, and the laser radar scans and obtains the first point cloud data under the static scenario around the target collecting point, or the laser radar scans and obtains multiple frames of raw point cloud data around the target collecting point, and joins the multiple frames of raw point cloud data together to obtain the first point cloud data.

The first point cloud data include point cloud of all static obstacles around the target collecting point, for example, may include buildings, guardrails, traffic lights, mountains and greening belts on both sides of the road, and cameras and their mounting rackets, and bridges above the road. The static obstacles all are relatively fixed and immobile obstacles. Furthermore, the first point cloud data of the static obstacles does not include any movable obstacles. The first point cloud data includes collected 3D coordinates of each point in each static obstacle around the target collecting point.

101: building a static background mesh model under the static scenario around the target collecting point according to the first point cloud data;

Since the obtained first point cloud data only includes static obstacles which all may serve as background information seen by the autonomous vehicle at the target collecting point, in the present embodiment it is feasible to build a static background mesh model under the static scenario around the target collecting point based on the obtained first point cloud data. The static background mesh model of the present embodiment is a 3-dimensional mesh model. A size of the static background mesh model in the 3-dimensional space matches with the size of the first point cloud data, to right surround the first point cloud. That is, this corresponds to dividing the mesh model from the 3-dimensional space of the first point cloud, and setting background attributes for meshes to obtain the static background mesh model under the static scenario around the target collecting point.

For example, the step 101 may specifically comprises the following steps:

(a1) performing mesh processing for the first point cloud data in a 3-dimensional space to obtain a 3-dimensional mesh model;

Each point in the first point cloud data in the present embodiment has 3-dimensional coordinates, and may be mapped to a point in the 3-dimensional space, and all points in the first point cloud data may be mapped into the 3-dimensional space according to corresponding 3-dimensional coordinates to obtain a first point cloud formed by a plurality of points. It is feasible to perform mesh processing for the 3-dimensional space occupied by the first point cloud, thereby obtaining the 3-dimensional mesh model formed by several meshes. Some meshes comprise valid points in the first point cloud data, whereas some meshes do not include valid points in the first point cloud data, i.e., they are empty meshes. A size granularity of each mesh of the 3-dimensional mesh model of the present embodiment goes in a way that a region with relatively dense point cloud in the first point cloud only includes one point, and may be specifically set according to the number of lines of the laser radar in practical application, and is not limited here.

(b1) according to whether each mesh in the 3-dimensional mesh model includes valid points in the first point cloud data, setting a background attribute for the corresponding mesh to obtain the static background mesh model under the static scenario around the target collecting point.

The background attribute of the mesh of the present embodiment characterizes whether the mesh includes a background point. For example, step (b1) may specifically comprise: judging whether meshes in the 3-dimensional mesh model include valid points in the first point cloud data, and if yes, determining the network as the background mesh, whereupon the background attribute of the corresponding mesh may be set as 1; otherwise, determining that the network is not the background mesh, whereupon the background attribute of the corresponding mesh is set as 0. As such, the static background mesh model comprised of background attributes 0 and 1 may be obtained.

102: collecting a second point cloud data of a target frame under the dynamic scenario after a dynamic obstacle moves around the target collecting point;

Likewise, it is feasible to use a laser radar mounted on the collecting vehicle positioned at the target collecting point to scan the target point cloud data of the target frame under the dynamic scenario after dynamic obstacles are added in the surrounding.

The present embodiment aims to annotate the point cloud of the dynamic obstacles to obtain training data for training the environment perception and decision-making control module of the autonomous vehicle. To obtain more sound training data, it is feasible to, in the present embodiment, control the moving dynamic obstacles as much diverse as possible, for example, the dynamic obstacles may be at different distances away from the collecting vehicle at the target collecting point and may appear from orientations at different angles, so that the laser radar scans the second point cloud data of the target frame in various cases. The target frame of the present embodiment may be any frame where various dynamic scenarios are collected. In a processing manner of the present embodiment, it is possible to annotate the point cloud of dynamic obstacles in the second point cloud data of any frame.

103: annotating the point cloud of the dynamic obstacle in the second point cloud data corresponding to the target frame, according to the static background mesh model.

Specifically, it is feasible to, by taking the static background mesh model as a reference, recognize and annotate the point cloud of dynamic obstacles in the second point cloud data corresponding to the target frame.

For example, step 103 may specifically comprise the following steps:
- (a2) projecting each target point of the second point cloud data into the static background mesh model;
- (b2) obtaining a background attribute of the mesh in the static background mesh model into which each target point is projected;
- (c2) according to the background attribute of the mesh in the static background mesh model into which each target point is projected, recognizing whether the corresponding target point belongs to a point of the dynamic obstacle;
- (d2) performing clustering processing for all points belonging to dynamic obstacles in the second point cloud data, to obtain the corresponding point cloud of dynamic obstacles.

Specifically, in the static background, after moving obstacles are added and within a region range that can be scanned by the laser radar, the point cloud of scanned dynamic obstacles does not exceed a region range of the static background mesh model. It is feasible to, according to the 3-dimensional coordinates of each target point in the second point cloud data, project each target point of the second point cloud data into the static background mesh model. As such, each target point may be projected into one mesh of the static background mesh model. It is feasible to, as for each target point, obtain the background attribute of the mesh in the static background mesh model into which each target point is projected; and then according to the background attribute of the mesh in the static background mesh model into which each target point is projected, recognize whether the corresponding target point belongs to a point of the dynamic obstacle.

For example, the step (c2) may specifically comprise: judging whether the background attribute of the mesh in the static background mesh model into which each target point is projected is 1 or 0. If the background attribute of the mesh in the static background mesh model into which the corresponding target point is projected is 1, this indicates that this mesh already includes the background point. Since the background and the dynamic obstacle are unlikely to be so close, the mesh impossibly includes the target point of the dynamic obstacle, so it may be determined that the target point is the background point of the static attribute; if the background attribute of the mesh in the static background mesh model into which the corresponding target point is projected is 0, this indicates that the mesh previously does not include the background point, whereupon the target point is projected to the mesh and thereby the target point is determined as the point of the dynamic obstacle.

It is possible to, through the above processing, identify all points belonging to the dynamic obstacles in the second point cloud data, and then perform clustering processing for all points belonging to the dynamic obstacles in the second point cloud data according to a clustering algorithm such as KMeans, to obtain a corresponding point cloud of the dynamic obstacle. It needs to be appreciated that if the second point cloud data includes a plurality of dynamic obstacles, the clustering processing may be performed to obtain point clouds of the plurality of dynamic obstacles.

Through the above embodiment, the point cloud of the dynamic obstacle may be annotated automatically. In practical application, it is possible to further increase classes of obstacles upon generating training data for training the environment perception and decision-making control model of the autonomous vehicle. Specifically, when the dynamic obstacles are added in the dynamic background, it is possible to add a dynamic obstacle of a known class each time so that annotation of the class of the dynamic obstacle may be implemented according to the class of the dynamic obstacle of the known class. Alternatively, it is also possible to preset class feature templates of various dynamic obstacles, compare according to the annotated point cloud of the dynamic obstacle and the class feature templates, obtain the annotated class of the dynamic obstacle and thereby obtain the training data corresponding to the dynamic obstacle.

The present embodiment only introduces a kind of annotation of the point cloud of the dynamic obstacle, wherein annotation of the point cloud of a static obstacle is not involved in the present disclosure. For particulars, please refer to any static obstacle point cloud annotation manner in the prior art, for example, it is possible to employ the current manual annotation manner to implement annotation of the point cloud of the static obstacle, and thereby achieve acquisition of the training data corresponding to the static obstacle. Reference may be made to the relevant prior art for details. Detailed depictions are not provided here any longer.

According to the dynamic obstacle point cloud annotating method according to the present embodiment, it is feasible to collect first point cloud data under a static scenario around a target collecting point; build the static background mesh model under the static scenario around the target collecting point according to the first point cloud data; collect a second point cloud data of a target frame under the dynamic scenario after a dynamic obstacle moves around the target collecting point; annotate the point cloud of the dynamic obstacle in the second point cloud data corresponding to the target frame, according to the static background mesh model. Through the technical solution of the present embodiment, it is feasible to automatically annotate the point cloud of the dynamic obstacle, effectively save manpower and annotation time spent in annotating the dynamic obstacle point cloud, and thereby effectively improve the efficiency of annotating the dynamic obstacle.

Figure 2:
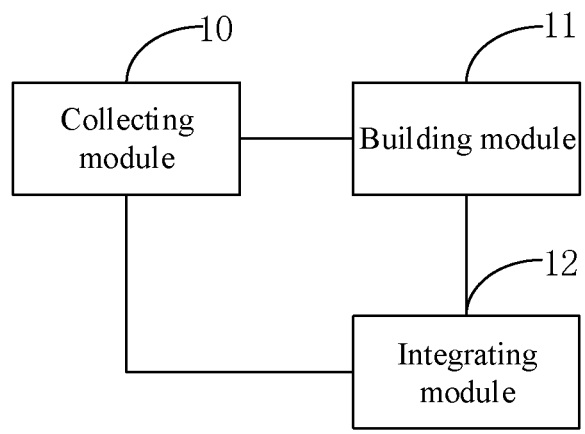
FIG. 2 is a structural diagram of Embodiment 1 of a dynamic obstacle point cloud annotating apparatus according to the present disclosure.

FIG. 2 is a structural diagram of Embodiment 1 of a dynamic obstacle point cloud annotating apparatus according to the present disclosure. As shown in FIG. 2, the dynamic obstacle point cloud annotating apparatus according to the present embodiment may specifically comprise: a collecting module 10, a building module 11 and an annotation module 12.

Wherein the collecting module 10 is configured to collect first point cloud data under a static scenario around a target collecting point;

The building module 11 is configured to build a static background mesh model under the static scenario around the target collecting point according to the first point cloud data collected by the collecting module 10;

The collecting module 10 is further configured to collect a second point cloud data of a target frame under the dynamic scenario after a dynamic obstacle moves around the target collecting point;

The annotating module 12 is configured to annotate the point cloud of dynamic obstacle in the second point cloud data corresponding to the target frame collected by the collecting module 10, according to the static background mesh model built by the building module 11.

Principles employed by the dynamic obstacle point cloud annotating apparatus according to the present embodiment to implement the dynamic obstacle point cloud annotation with the above modules and the resultant technical effects are the same as those of the above-mentioned method embodiments. For particulars, please refer to the depictions of the aforesaid relevant method embodiments, and no detailed depictions will be presented here.

Figure 3:
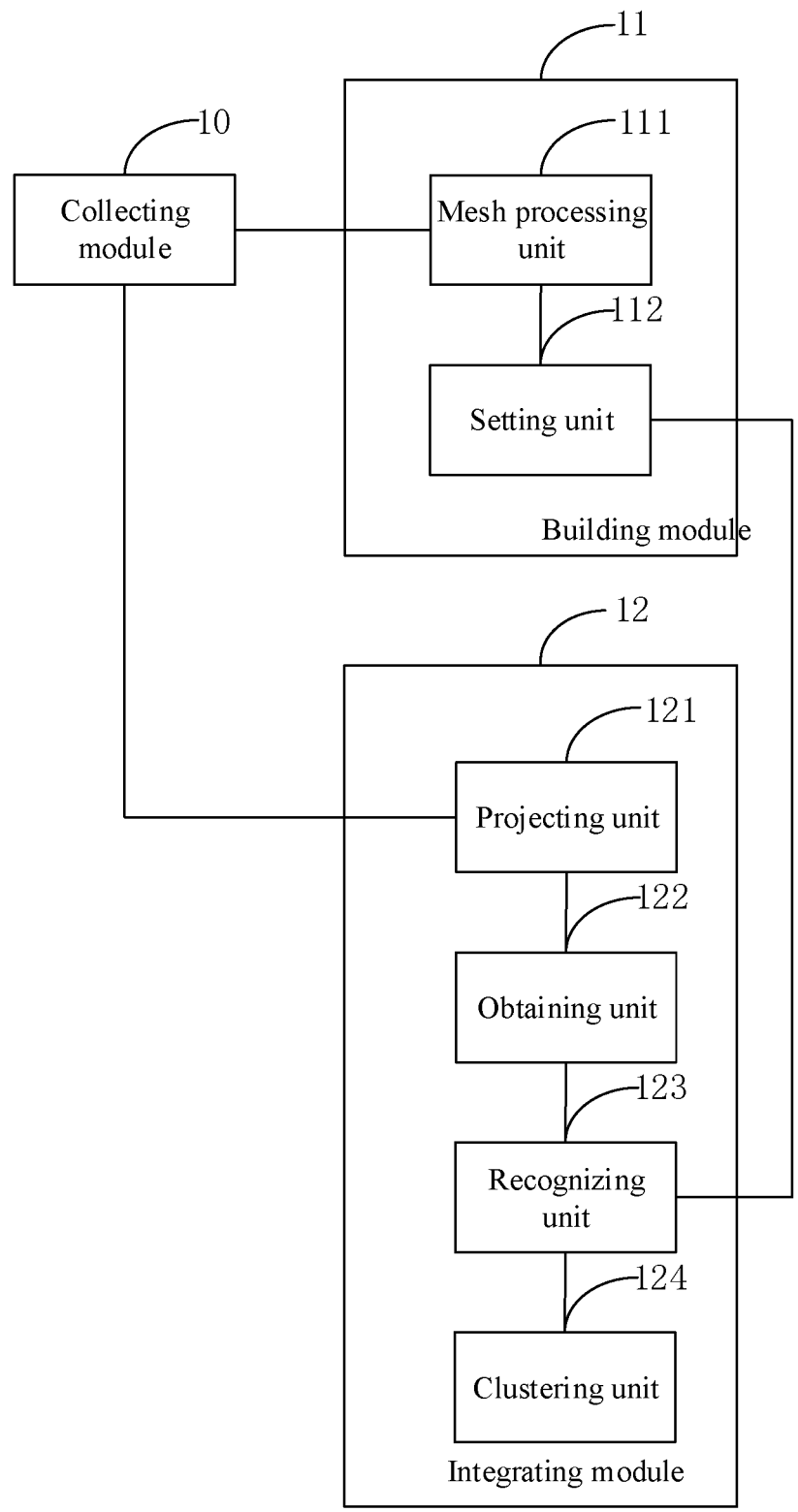
FIG. 3 is a structural diagram of Embodiment 2 of a dynamic obstacle point cloud annotating apparatus according to the present disclosure.

FIG. 3 is a structural diagram of Embodiment 2 of a dynamic obstacle point cloud annotating apparatus according to the present disclosure. As shown in FIG. 3, the dynamic obstacle point cloud annotating apparatus according to the present embodiment further introduces the technical solution of the present disclosure in more detail on the basis of the technical solution of the embodiment shown in FIG. 2.

As shown in FIG. 3, in the dynamic obstacle point cloud annotating apparatus according to the present embodiment, the building module 11 specifically comprises:

a mesh processing unit 111 configured to perform mesh processing for the first point cloud data collected by the collecting module 10 in a 3-dimensional space to obtain a 3-dimensional mesh model;

a setting unit 112 configured to, according to whether each mesh in the 3-dimensional mesh model obtained by the mesh processing unit 111 includes valid points in the first point cloud data, set a background attribute for the corresponding mesh to obtain the static background mesh model under the static scenario around the target collecting point.

Further optionally, in the dynamic obstacle point cloud annotating apparatus according to the present embodiment, the setting unit 112 is specifically configured to judge whether meshes in the 3-dimensional mesh model include valid points in the first point cloud data, and if yes, set the background attribute of the corresponding mesh as 1; otherwise, set the background attribute of the corresponding mesh as 0.

As shown in FIG. 3, further optionally, in the dynamic obstacle point cloud annotating apparatus according to the present embodiment, the annotating module 12 comprises:

a projecting unit 121 configured to project each target point of the second point cloud data collected by the collecting module 10 into the static background mesh model;

an obtaining unit 122 configured to obtain, from the static background mesh module, a background attribute of the mesh in the static background mesh model into which each target point is projected by the projecting unit 121;

a recognizing unit 123 configured to, according to the obtaining unit 122—obtained background attribute of the mesh in the static background mesh model set by the setting unit 112 into which each target point is projected, recognize whether the corresponding target point belongs to a point of the dynamic obstacle;

a clustering unit 124 configured to perform clustering processing for all recognizing unit 123—recognized points belonging to dynamic obstacles in the second point cloud data, to obtain the corresponding point cloud of dynamic obstacle.

Further optionally, in the dynamic obstacle point cloud annotating apparatus according to the present embodiment, the recognizing unit 123 is specifically configured to:

judge whether the obtaining unit 122—obtained background attribute of the mesh in the static background mesh model into which each target point is projected is 1 or 0;

if the background attribute of the mesh in the static background mesh model into which the corresponding target point is projected is 1, determine the target point as the background point of the static attribute;

if the background attribute of the mesh in the static background mesh model into which the corresponding target point is projected is 0, determine the target point as the point of the dynamic obstacle.

Principles employed by the dynamic obstacle point cloud annotating apparatus according to the present embodiment to implement the dynamic obstacle point cloud annotation with the above modules and the resultant technical effects are the same as those of the above-mentioned method embodiments. For particulars, please refer to the depictions of the aforesaid relevant method embodiments, and no detailed depictions will be presented here.

Figure 4:
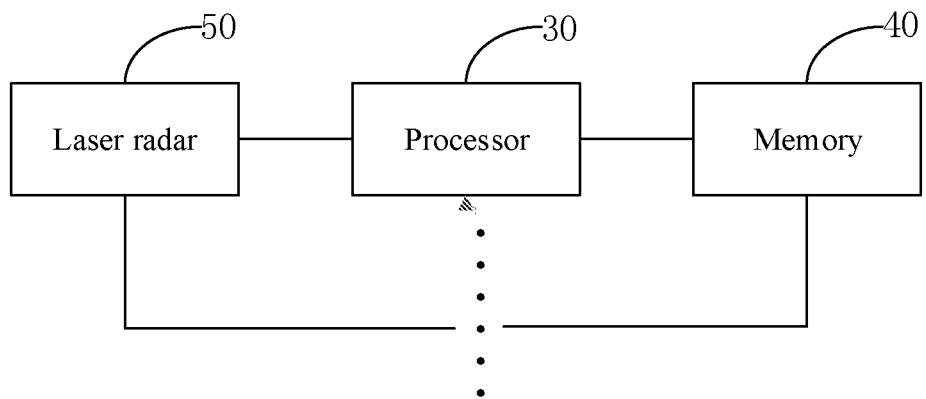
FIG. 4 is a structural diagram of an embodiment of a computer device according to the present disclosure.

FIG. 4 is a structural diagram of an embodiment of a computer device according to the present disclosure. As shown in FIG. 4, the computer device according to the present embodiment comprises: one or more processors 30, and a memory 40 and a laser radar 50. The laser radar is used to scan the point cloud data under the static scenario around the target collecting point or under the dynamic scenario after the dynamic obstacle moves. Furthermore, the laser radar 50 communicates with the processor 30 and is used to send the scanned point cloud data to the processor 30 so that the processor 30, according to the program stored in the memory 40, implements collection of the first point cloud data under the static scenario around the target collecting point and the second point cloud data of the target frame under the dynamic scenario around the target collecting point after the dynamic obstacle moves, according to the point cloud data scanned by the laser radar. That is to say, the memory 40 is used to store one or more programs; the one or more programs stored in the memory 40, when executed by said one or more processors 30, enable said one or more processors 30 to implement the dynamic obstacle point cloud annotating method in the embodiment shown in FIG. 1. In the embodiment shown in FIG. 4, an example is taken in which the computer device comprises a plurality of processors 30.

Figure 5:
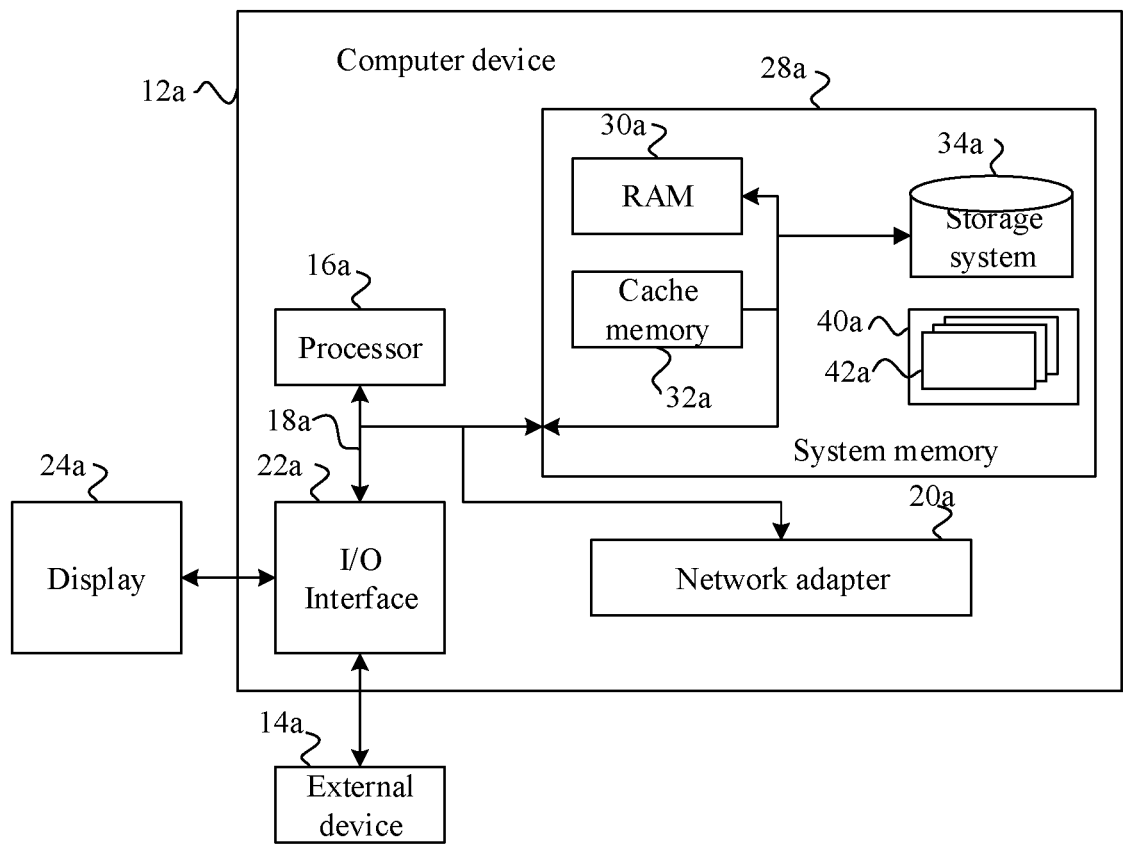
FIG. 5 is an example diagram of a computer device according to the present disclosure.

For example, FIG. 5 is an example diagram of a computer device according to an embodiment of the present disclosure. FIG. 5 shows a block diagram of an example computer device 12a adapted to implement an implementation mode of the present disclosure. The computer device 12a shown in FIG. 5 is only an example and should not bring about any limitation to the function and scope of use of the embodiments of the present disclosure.

As shown in FIG. 5, the computer device 12a of the autonomous vehicle is shown in the form of a general-purpose computing device. The components of computer device 12a of the autonomous vehicle may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a of the autonomous vehicle typically includes a variety of computer system readable media. Such media may be any available media that is accessible by computer device 12a of the autonomous vehicle, and it includes both volatile and non-volatile media, removable and non-removable media.

The system memory 28a can include computer system readable media in the form of volatile memory, such as random access memory (RAM) 30a and/or cache memory 32a. Computer device 12a of the autonomous vehicle may further include other removable/non-removable, volatile/non-volatile computer system storage media. By way of example only, storage system 34a can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 3 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 3 of the present disclosure.

Computer device 12a of the autonomous vehicle may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a of the autonomous vehicle to communicate with one or more other computing devices. Such communication can occur via Input/Output (I/O) interfaces 22a. Still yet, computer device 12a of the autonomous vehicle can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a of the autonomous vehicle via bus 18a. It should be understood that although not shown, other hardware and/or software modules could be used in conjunction with computer device 12a of the autonomous vehicle. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the dynamic obstacle point cloud annotating method shown in the above embodiments.

The present disclosure further provides a computer readable medium on which a computer program is stored, the program, when executed by a processor, implementing the dynamic obstacle point cloud annotating method shown in the above embodiments.

The computer readable medium of the present embodiment may include RAM30a, and/or cache memory 32a and/or a storage system 34a in the system memory 28a in the embodiment shown in FIG. 5.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A dynamic obstacle point cloud annotating method, wherein the method comprises:
    collecting first point cloud data under a static scenario around a target collecting point;
    building a static background mesh model under the static scenario around the target collecting point according to the first point cloud data;
    collecting a second point cloud data of a target frame under a dynamic scenario after a dynamic obstacle moves around the target collecting point;
    annotating the point cloud of dynamic obstacle in the second point cloud data corresponding to the target frame, according to the static background mesh model,
    wherein the building a static background mesh model under the static scenario around the target collecting point according to the first point cloud data specifically comprises:
    performing mesh processing for the first point cloud data in a 3-dimensinal space to obtain a 3-dimensional mesh model;
    setting a background attribute for the corresponding mesh according to whether or not each mesh in the 3-dimensional mesh model includes valid points in the first point cloud data, to obtain the static background mesh model under the static scenario around the target collecting point,
    wherein the step of, according to whether each mesh in the 3-dimensional mesh model includes valid points in the first point cloud data, setting a background attribute for the corresponding mesh specifically comprises:
    judging whether meshes in the 3-dimensional mesh model include valid points in the first point cloud data, and if yes, setting the background attribute of the corresponding mesh as 1; otherwise, setting the background attribute of the corresponding mesh as 0,
    wherein the annotating the point cloud of dynamic obstacle in the second point cloud data corresponding to the target frame, according to the static background mesh model specifically comprises:
    projecting each target point of the second point cloud data into the static background mesh model;
    obtaining the background attribute of the mesh in the static background mesh model into which each target point is projected;
    according to the background attribute of the mesh in the static background mesh model into which each target point is projected, recognizing whether the corresponding target point belongs to a point of the dynamic obstacle;
    performing clustering processing for all points belonging to dynamic obstacles in the second point cloud data, to obtain the corresponding point cloud of dynamic obstacle.

2. The method according to claim 1, wherein the step of, according to the background attribute of the mesh in the static background mesh model into which each target point is projected, recognizing whether the corresponding target point belongs to a point of the dynamic obstacle specifically comprises:
    judging whether the background attribute of the mesh in the static background mesh model into which each target point is projected is 1 or 0;
    if the background attribute of the mesh in the static background mesh model into which the corresponding target point is projected is 1, determining the target point as the background point of the static attribute;
    if the background attribute of the mesh in the static background mesh model into which the corresponding target point is projected is 0, determining the target point as the point of the dynamic obstacle.

3. A computer device, wherein the device comprises:
    one or more processors;
    a storage for storing one or more programs;
    a laser radar used to scan point cloud data under a static scenario around a target collecting point or under a dynamic scenario after a dynamic obstacle moves;
    the one or more programs, when executed by said one or more processors, enable said one or more processors to implement a dynamic obstacle point cloud annotating method, wherein the method comprises:
    collecting first point cloud data under a static scenario around a target collecting point;

building a static background mesh model under the static scenario around the target collecting point according to the first point cloud data;

collecting a second point cloud data of a target frame under a dynamic scenario after a dynamic obstacle moves around the target collecting point;

annotating the point cloud of dynamic obstacle in the second point cloud data corresponding to the target frame, according to the static background mesh model, wherein the building a static background mesh model under the static scenario around the target collecting point according to the first point cloud data specifically comprises:

performing mesh processing for the first point cloud data in a 3-dimensinal space to obtain a 3-dimensional mesh model;

setting a background attribute for the corresponding mesh according to whether or not each mesh in the 3-dimensional mesh model includes valid points in the first point cloud data, to obtain the static background mesh model under the static scenario around the target collecting point, wherein the step of, according to whether each mesh in the 3-dimensional mesh model includes valid points in the first point cloud data, setting a background attribute for the corresponding mesh specifically comprises:

judging whether meshes in the 3-dimensional mesh model include valid points in the first point cloud data, and if yes, setting the background attribute of the corresponding mesh as 1; otherwise, setting the background attribute of the corresponding mesh as 0, wherein the annotating the point cloud of dynamic obstacle in the second point cloud data corresponding to the target frame, according to the static background mesh model specifically comprises:

projecting each target point of the second point cloud data into the static background mesh model;

obtaining the background attribute of the mesh in the static background mesh model into which each target point is projected;

according to the background attribute of the mesh in the static background mesh model into which each target point is projected, recognizing whether the corresponding target point belongs to a point of the dynamic obstacle;

performing clustering processing for all points belonging to dynamic obstacles in the second point cloud data, to obtain the corresponding point cloud of dynamic obstacle.

4. The computer device according to claim 3, wherein the step of, according to the background attribute of the mesh in the static background mesh model into which each target point is projected, recognizing whether the corresponding target point belongs to a point of the dynamic obstacle specifically comprises:

judging whether the background attribute of the mesh in the static background mesh model into which each target point is projected is 1 or 0;

if the background attribute of the mesh in the static background mesh model into which the corresponding target point is projected is 1, determining the target point as the background point of the static attribute;

if the background attribute of the mesh in the static background mesh model into which the corresponding target point is projected is 0, determining the target point as the point of the dynamic obstacle.

5. A non-transitory computer readable medium on which a computer program is stored, wherein the program, when executed by a processor, implements a dynamic obstacle point cloud annotating method, wherein the method comprises:

collecting first point cloud data under a static scenario around a target collecting point;

building a static background mesh model under the static scenario around the target collecting point according to the first point cloud data;

collecting a second point cloud data of a target frame under a dynamic scenario after a dynamic obstacle moves around the target collecting point;

annotating the point cloud of dynamic obstacle in the second point cloud data corresponding to the target frame, according to the static background mesh model, wherein the building a static background mesh model under the static scenario around the target collecting point according to the first point cloud data specifically comprises:

performing mesh processing for the first point cloud data in a 3-dimensinal space to obtain a 3-dimensional mesh model;

setting a background attribute for the corresponding mesh according to whether or not each mesh in the 3-dimensional mesh model includes valid points in the first point cloud data, to obtain the static background mesh model under the static scenario around the target collecting point, wherein the step of, according to whether each mesh in the 3-dimensional mesh model includes valid points in the first point cloud data, setting a background attribute for the corresponding mesh specifically comprises:

judging whether meshes in the 3-dimensional mesh model include valid points in the first point cloud data, and if yes, setting the background attribute of the corresponding mesh as 1; otherwise, setting the background attribute of the corresponding mesh as 0, wherein the annotating the point cloud of dynamic obstacle in the second point cloud data corresponding to the target frame, according to the static background mesh model specifically comprises:

projecting each target point of the second point cloud data into the static background mesh model;

obtaining the background attribute of the mesh in the static background mesh model into which each target point is projected;

according to the background attribute of the mesh in the static background mesh model into which each target point is projected, recognizing whether the corresponding target point belongs to a point of the dynamic obstacle;

performing clustering processing for all points belonging to dynamic obstacles in the second point cloud data, to obtain the corresponding point cloud of dynamic obstacle.

6. The non-transitory computer readable medium according to claim 5, wherein the step of, according to the background attribute of the mesh in the static background mesh model into which each target point is projected, recognizing whether the corresponding target point belongs to a point of the dynamic obstacle specifically comprises:

judging whether the background attribute of the mesh in the static background mesh model into which each target point is projected is 1 or 0;

if the background attribute of the mesh in the static background mesh model into which the corresponding target point is projected is 1, determining the target point as the background point of the static attribute;

if the background attribute of the mesh in the static background mesh model into which the corresponding target point is projected is 0, determining the target point as the point of the dynamic obstacle.

\* \* \* \* \*